United States Patent
Garrett

(10) Patent No.: US 11,023,882 B2
(45) Date of Patent: Jun. 1, 2021

(54) METHOD AND APPARATUS FOR COMPLETING CREDIT CARD TRANSACTIONS FROM AN MST AND NFC CAPABLE MODULE AFFIXED TO A SMART PHONE, A MOBILE WALLET, A PERSONAL DIGITAL ASSISTANT OR THE CASES FOR SAME

(71) Applicant: Peter Garrett, San Francisco, CA (US)

(72) Inventor: Peter Garrett, San Francisco, CA (US)

(73) Assignee: Edge Mobile Payments LLC, Mill Valley, CA (US)

( * ) Notice: Subject to any disclaimer, the term of this patent is extended or adjusted under 35 U.S.C. 154(b) by 0 days.

(21) Appl. No.: 16/880,697

(22) Filed: May 21, 2020

(65) Prior Publication Data

US 2020/0286070 A1    Sep. 10, 2020

Related U.S. Application Data

(63) Continuation-in-part of application No. 16/054,985, filed on Aug. 3, 2018, now Pat. No. 10,922,681.

(60) Provisional application No. 62/645,490, filed on Mar. 20, 2018, provisional application No. 62/540,575, filed on Aug. 3, 2018.

(51) Int. Cl.
| | |
|---|---|
| *G06Q 20/32* | (2012.01) |
| *G06Q 20/36* | (2012.01) |
| *G06Q 20/22* | (2012.01) |
| *H04B 5/00* | (2006.01) |
| *G06Q 20/20* | (2012.01) |

(52) U.S. Cl.
CPC ....... *G06Q 20/3278* (2013.01); *G06Q 20/204* (2013.01); *G06Q 20/229* (2020.05); *G06Q 20/3226* (2013.01); *G06Q 20/363* (2013.01); *H04B 5/0031* (2013.01); *G06Q 2220/00* (2013.01)

(58) Field of Classification Search
CPC .......... G06Q 20/3278; G06Q 20/3226; G06Q 20/363; G06Q 20/229; G06Q 20/204; G06Q 2220/00; H04B 5/0031
See application file for complete search history.

(56) References Cited

U.S. PATENT DOCUMENTS 10,565,577 B2 *    2/2020    Peri ...................... G06Q 20/322

* cited by examiner

*Primary Examiner* — Seung H Lee
(74) *Attorney, Agent, or Firm* — Lamon Patent Services; Cynthia S. Lamon

(57) ABSTRACT

A workaround for smartphone manufacturers locking out certain uses of NFC technology is presented as a system for the completion of wireless credit card transactions using an auxiliary electronics module affixed to a personal digital assistant or smart phone wherein the electronics module is enabled with 2 types of wireless credit card transaction technologies. One of the technologies is NFC and the other is MST. The auxiliary electronics module is enabled to perform an NFC or an MST transactions based on the phones locked status and or the POS capability. The affixed electronics module communicating with the device to which it is affixed with BLE wireless technology.

2 Claims, 11 Drawing Sheets

METHOD AND APPARATUS FOR COMPLETING CREDIT CARD TRANSACTIONS FROM AN MST AND NFC CAPABLE MODULE AFFIXED TO A SMART PHONE, A MOBILE WALLET, A PERSONAL DIGITAL ASSISTANT OR THE CASES FOR SAME

CROSS-REFERENCE TO RELATED DOCUMENTS

This US Non-Provisional patent application claims priority as a continuation in part to co-pending application Ser. No. 16/054,985 filed on Aug. 3, 2018 which claims priority to provisional application Ser. No. 62/540,575 filed Aug. 3, 2017 and provisional application 62/645,490 filed on Mar. 20, 2018. All of the above mentioned priority claims are included herein at least by reference.

BACKGROUND OF THE INVENTION

1. Field of the Invention

The present invention is in the field of credit card transactions.

2. Discussion of the State of the Art

In the field of wireless credit card transactions there are certain wireless technologies in use. One is near field communication which is known as "NFC". Near-field Communication (NFC) is a set of communication protocols that enable two electronic devices, one of which is usually a portable device such as a smartphone, to establish communication by bringing them within 4 cm (1.6 in) of each other. In the art, one device us usually an interrogation device and one is a mobile device. NFC devices are used in contactless payment systems, similar to those used in credit cards and electronic ticket smartcards and allow mobile payment to replace/supplement these systems. This is sometimes referred to as NFC/CTLS (Contactless) or CTLS NFC. NFC-enabled portable devices can be provided with application software, for example to make payments when connected to an NFC-compliant apparatus. Earlier close-range communication used technology that was proprietary to the manufacturer, for applications such as stock ticket, access control and payment readers. Like other "proximity card" technologies, NFC employs electromagnetic induction between two loop antennas when NFC-enabled devices—for example a smartphone and a printer—exchange information, operating within the globally available unlicensed radio frequency ISM band of 13.56 MHz on ISO/IEC 18000-3 air interface at rates ranging from 106 to 424 kbit/s. Each full NFC device can work in three modes:

NFC card emulation—enables NFC-enabled devices such as smartphones to act like smart cards, allowing users to perform transactions such as payment or ticketing.

NFC reader/writer—enables NFC-enabled devices to read information stored on inexpensive NFC tags embedded in labels or smart posters.

NFC peer-to-peer—enables two NFC-enabled devices to communicate with each other to exchange information in an ad hoc fashion.

Another wireless technology used for credit card transactions is Magnetic Secure Transmission (MST). This technology emits a magnetic signal that mimics the magnetic strip on a traditional payment card. MST sends a magnetic signal from a smart phone to the payment terminal's card reader (to emulate swiping a physical card without having to upgrade the terminal's software or hardware). MST technology is accepted at nearly all payment terminals with a card reader. Some payment terminals may require simple software updates. Simply select a card from Samsung Pay, and transmit the payment information by moving your device within an inch of the payment terminal (Not NFC). Your transaction and payment information will be kept private and secure with the use of tokenization. MST is more secure than using a traditional payment card and is as secure as paying with Near Field Communication (NFC). In one embodiment MST technology is used to inductively charge a credit card or debit card from a smartphone case.

Apple iPhone 6 joined the majority of smartphones by containing an NFC controller. However, at the moment, this new iPhone is locked down only to the Apple Pay mobile payment system. This means that iPhone 6 users are unable to take advantage of the massive potential of NFC through apps, tags and communication.

Applications would benefit from NFC as current apps could be updated and new Apps could be developed and released to use this new functionality. NFC could be used in a number of ways in new applications. Apps could be released that write or read the tags or encode the tags with web links or trigger system setting changes. Another potential application could allow communication between devices, like Android Beam, that can send information easily from one device to another. Developing this theme of communication, applications could be used to connect and pass information from phones to other smart devices around the home, developing the Internet of Things and becoming a proximal wonderland for users.

NFC functionality could be incorporated into existing apps from retailers and other companies. This is one of the most interesting uses as it will allow stores to easily and intuitively interact with their customers. For example, NFC tags could be linked to further information on products or retailer's apps could allow extra functionality such as saving items for later. This concept is already being pioneered by Topshop using barcodes to save items for review, however using NFC tags would allow for a better experience, increasing ease of use for the users and so greater rewards for the retailer. Based on the range of apps that can tap into this NFC functionality, it is likely that, when the iPhone's NFC is unlocked, the next 'killer app' will use this feature.

What is clearly needed is a way to bypass all of the proprietary locked down wireless payment systems and enable the user to choose which payment system he really wants to use and enjoy the other functionality of NFC including but not limited to NFC card emulation which enables NFC-enabled devices such as smartphones to act like smart cards, allowing users to perform transactions such as payment or ticketing, NFC reader/writer which enables NFC-enabled devices to read information stored on inexpensive NFC tags embedded in labels or smart posters and or NFC peer-to-peer which enables two NFC-enabled devices to communicate with each other to exchange information in an ad hoc fashion.

BRIEF SUMMARY OF THE INVENTION

In one embodiment a smartphone is taught comprising an electronics module affixed to the smartphone, said electronics module not being original equipment of the smartphone. The electronics module has NFC transceiving and financial transaction capability. The electronics module also having an MST financial transaction capability and BLE communication capability with the smartphone.

In one embodiment the smartphone being affixed to electronics module is capable of NFC and or MST financial transaction capability, and wherein BLE communication from electronics module to smartphone is configured to complete a financial transaction through any of its wireless connectivity and wherein smart wallet software is resident on smartphone.

In one embodiment the module comprises a software instance for credit card secure element information acquisition and implementation for handling multiple credit card secure element information sets is part of module.

In one embodiment the module comprises a secure element that can exist within a removable smart chip, SD card, or embedded within a fixed chip on said module.

In one embodiment smart wallet software is resident on smartphone and in the cloud.

In one embodiment credit card indicia can be selected from smart wallet software to initiate a financial transaction.

In one embodiment a financial transaction is initiated through a POS device and further wherein credit card or financial account indicia are presented on a POS touch screen such that a user may select his account by tapping the POS screen to initiate a financial transaction In one embodiment the module affixed to smartphone is used to bypass a wireless capability disabled by or made unavailable to a user by the smartphone manufacturer if a use wishes to use a competitor's mobile payment system.

In one embodiment the smartphone affixed with electronics module wherein the wireless capability disabled by or made unavailable to a user by the smartphone manufacturer is NFC.

In one embodiment the smartphone affixed with electronics module wherein the wireless capability disabled by or made unavailable to a user by the smartphone manufacturer is MST.

In one embodiment a wireless electronics module is disclosed comprising an NFC transceiving capability, a BLE transceiving capability, an MST capability, a battery a host MCU, a fully compliant secure element module capable of handling multiple credit card financial datasets, a coil providing NFC wireless transceiving capability, a coil providing MST financial transaction capability, a coil providing BLE wireless transceiving capability, a coil providing inductive charging capability wherein said module may be attached to any wearable wherein the wearable is used to initiate at least one of a financial transaction, an entry to a movie, the use coupons, a ticket for any venue.

In one embodiment credit card indicia may be selected from smart wallet software resident on the smart phone to initiate a financial transaction.

In one embodiment a second wireless communication between said module and a point of sale device or POS is taught resulting in a wireless credit card transaction capability called magnetic secure transmission or MST.

In one embodiment secure elements relating to at least 2 credit cards are held on the electronics module.

In one embodiment smart wallet software is resident on smartphone and in the cloud and wherein said module can transfer or receive credit card information with another smartphone and wherein a user 1 may authorize another user 2 such as a family member, through the smart wallet application, to grant authorization for a family member or friend to use a credit card for purchases.

In one embodiment user 1 who is loaning another user 2 a credit card for purchases can initiate limits on amount of the purchases of user 2.

In one embodiment user 1 is loaning user 2 a credit card for purchases and user 1 can initiate limits where she can go to make purchases based on a tracking function of the smart wallet application through GPS or phone tracking function.

In one embodiment any or all of said coils of the module of the invention, residing in or on the case of a smartphone, may be adapted through MCU circuitry to canvass/sense the immediate area for electromagnetic fields sufficient to harvest said EMF through said coils to glean energy from the EMF environment to charge the battery of the module of the invention or a smartcard battery 922 capable of being inductively charged being in sufficient proximity to the module of the invention to be inductively charged.

When a smartcard, debit or credit card is referred to in this specification the inventor is speaking of any card or payment card with a battery capable of being charged. The card could be a loyalty card, gas card etc. . . . In one embodiment a smart card (debit or credit) having a battery 922 capable of being inductively charged may be inductively charged by utilizing any or all of the coils of the module of the invention to harvest any EMF energy from the use of a smartphone while the smartphone is in a smartphone case, the case incorporating at least the functionality of the module of the invention. The energy gleaned from the EMF of the smartphone use may be used to charge the module of the invention such that when the battery in the module of the invention reaches a certain level said module will then send charge to battery 922 of the smart debit or credit card through either physical contacts or inductively while in sufficient proximity.

DETAILED DESCRIPTION OF THE INVENTION

The present invention provides a wireless electronics module that may be co-joined or affixed to a phone, any phone case of wallet or any other personal items or electronics devices including watches and watch computers. The module enabled is with "Near field Communications" technology hereafter "NFC" and Magnetic Secure Transmission technology hereafter "MST" technology. The module may be in wireless communication with an application installed on the portable electronic device to which it is affixed such as a smart phone a digital walled or personal digital assistant. The application enabling wireless credit card transactions with NFC enabled point of sale devices. Even if the POS is not NFC enabled the module may use MST to push a magnetic signature emulating a credit card magnetic stripe.

In the current state of the art device manufacturers have locked down the NFC capability on their devices through software. This is so that the users have to use the proprietary applications installed on the device. One example of this is the Apple Iphone and its payment system Apple Pay. Iphone users can use Apple Pay but they cannot use a third party application that is enabled with NFC capability. Typically wireless payment cards use only one wireless technology in their payment systems and they do not work everywhere.

In various embodiments described in enabling detail herein, the inventors provide a method and apparatus for devices where NFC functionality is not available to the user for one reason or another.

Figure 1:
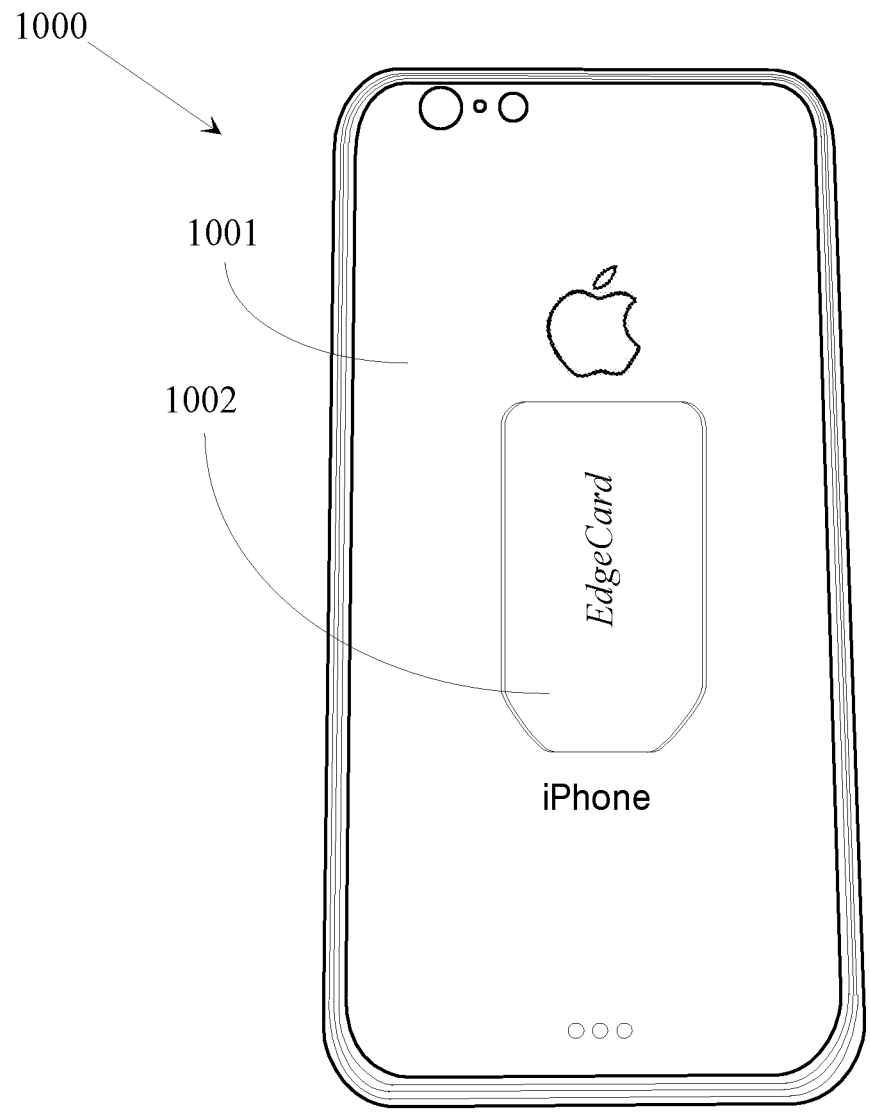
FIG. 1 is a back view of an illustration of a smart phone with a module of the present invention attached.

FIG. 1 is a back view of an illustration 1000 of a smart phone 1001 with a module 1002 of the present invention attached, co-joined or affixed. The attachment of module 1002 may be magnetic, adhesive, surface adhesion or wringing the material of the module to the material of the device. Wringing is the process of sliding two blocks together so that their faces lightly bond. Because of their ultra flat surfaces, when wrung, gauge blocks adhere to each other tightly. Properly wrung blocks may withstand a 75 lbf (330 N) pull. While the exact mechanism that causes wringing is unknown, it is believed to be a combination of Air pressure applies pressure between the blocks because the air is squeezed out of the joint. Surface tension from oil and or water vapor that is present between the blocks. Molecular attraction occurs when two very flat surfaces are brought into contact. This force causes gauge blocks to adhere even without surface lubricants, and in a vacuum. The method of attachment can be various; in fact any adhesion technology may be employed here.

The smart phone 1001 of figure one has NFC, MST and Bluetooth capability built in from the factory by the manufacture but the user cannot unitize the functionality of the NFC capability for his or her own use. Primarily The manufacturer enables its NFC capability for its own proprietary pay technology. The manufacturer has essentially locked down the NFC functionality except for its own proprietary uses. The inventor has come up with a way for any smartphone, smartphone case, or any digital assistant or the case of same to be enabled to perform, among other things, a wireless credit card transaction at any POS regardless of the age or type of POS. Module 1002 which the inventor calls EdgeLink™ (hereafter module) is an electronics module that has the appropriate circuitry and wireless functionality that, when affixed to a device (in this embodiment the back of a smart phone) 1001, will enable that device to perform wireless functionality of NFC, MST and BLE wireless technologies. The module 1002 may, in other embodiments, be enabled with any other wireless protocols in existence or that will be in existence such as a radio frequency, an infrared transmission, a digital signal, a cellular signal, a sonic output, or a vibrational wave.

Figure 2:
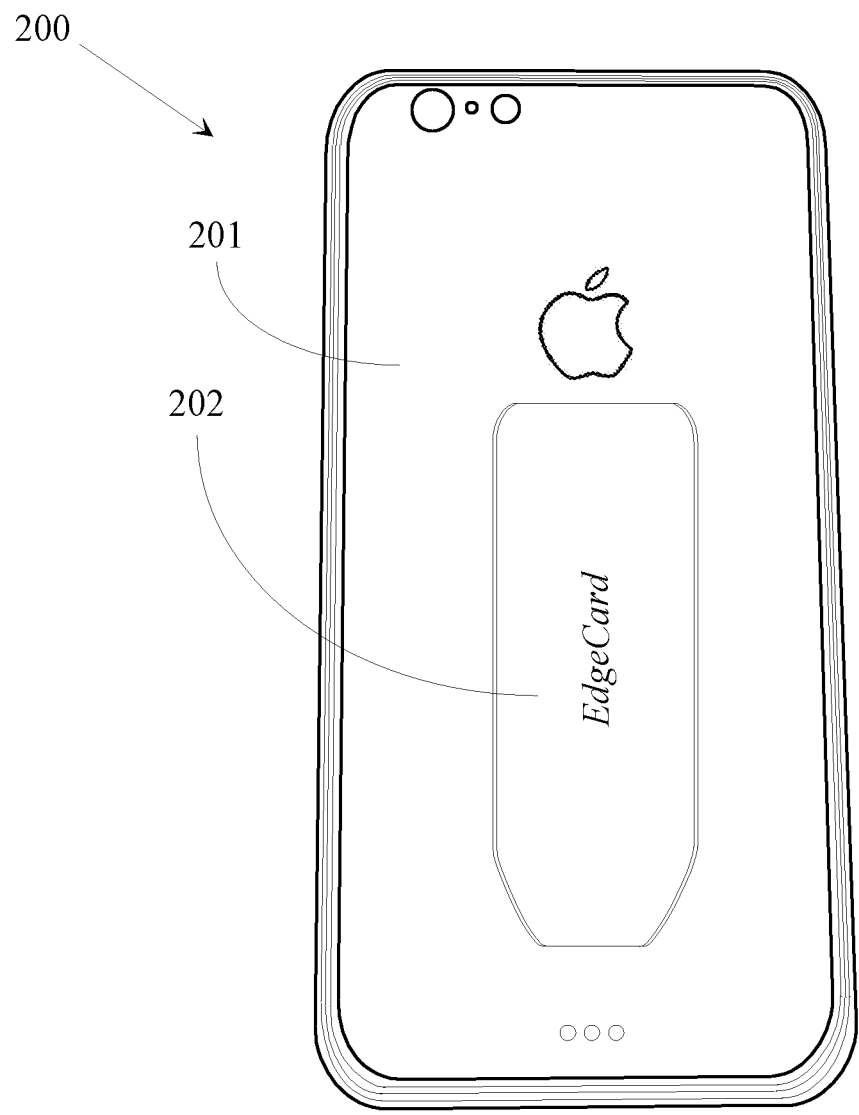
FIG. 2 is a back view of an illustration of smart phone with a module of the present invention attached according to one embodiment of the invention.

FIG. 2 is an illustration of the back of a smart phone 201 with the module 202 of the present invention shown affixed. Together the device 200 may perform all of the functionality discussed with reference to FIG. 1. In this embodiment the module 202 is longer than shown in FIG. 1 and it edges are beveled so that when affixed to smart phone 200, it will slide into or may be inserted into any existing case made for the smartphone or digital assistant the module 202 is adhered to without any modifications. The form factor is not limited to what is shown in the drawings. The form could take any shape conducive for sliding into a case with the module 202 affixed. In one embodiment the module 202 form factor could cover the entire back of a smart phone. The form factor of module 202 can conform to any smart phone, digital assistant or any case for such devices. Module 202 can be made as part of a case for such a device as well enabling the device in the case to enjoy all of the functionality of module 202. Module 202 may be so miniaturized that it may also be co-joined to any wearable device such as a ring, a watch, clothing, a hat, a wrist band etc. . . .

Any other wearable may be co-joined with module 202 to initiate a financial transaction, enter a movie, use coupons, may be used as a ticket for any venue . . . .

Figure 3:
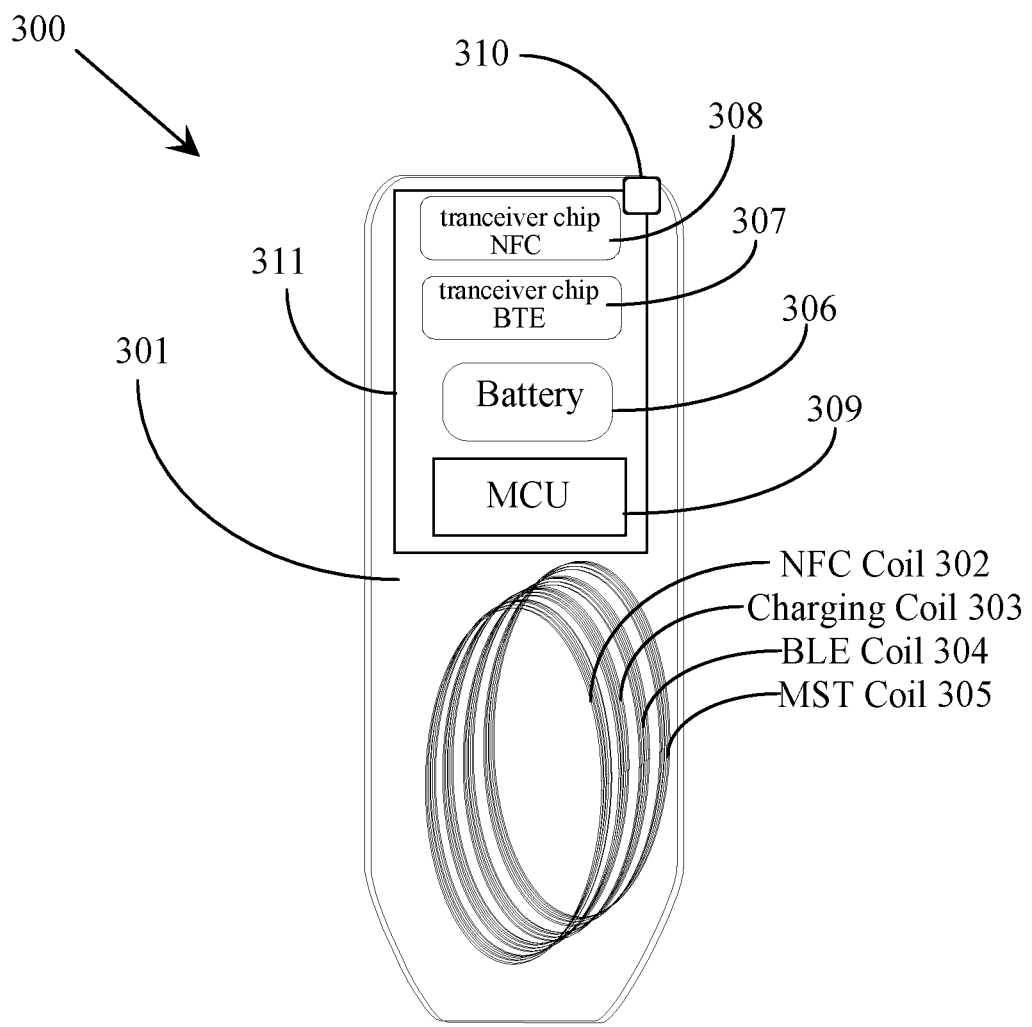
FIG. 3 is a view of a top view of a module of the present invention showing electronics and coils according to one embodiment of the invention.

FIG. 3 shows the some of the circuitry enabling the functionality of the module in a preferred embodiment of the present invention. An antenna that may be a fractal antenna 310 is used in some embodiments. A fractal antenna is an antenna that uses a fractal, self-similar design to maximize the length, or increase the perimeter (on inside sections or the outer structure), of material that can receive or transmit electromagnetic radiation within a given total surface area or volume. Such fractal antennas are also referred to as multilevel and space filling curves, but the key aspect lies in their repetition of a motif over two or more scale sizes, or "iterations". For this reason, fractal antennas are very compact, multiband or wideband, and have useful applications in cellular telephone and microwave communications. This invention is not limited to fractal antennas as other antenna configurations may also be used.

Module 300 contains a transceiver chip/controller and associated circuitry 308 that enables NFC communication to and from any device also enabled with NFC technology. All circuitry is contained on board 311 of FIG. 3 or board 313 of FIG. 3A (note multiple boards may be used as necessary). NFC Coil 302 and circuitry 308 together enable part of the NFC functionality. Module 300 is enabled with NFC card emulation which enables NFC-enabled devices such as smartphones to act like smart cards, allowing users to perform transactions such as payment or ticketing. Module 300 is enabled as a NFC reader/writer as well which enables NFC enabled devices to read information stored on inexpensive NFC tags embedded in labels or smart posters. This enables Module 300 to read all NFC enabled devices, tags, posters etc. . . . Module 300 is also enabled with NFC peer-to-peer technology which enables two NFC-enabled devices to communicate with each other to exchange information in an ad hoc fashion. In the latter peer-to-peer embodiment module 300 can transfer or receive credit card information from another user enabling module 300 to perform credit card transactions with another user's card such as a Mother giving her daughter authority to use her card for purchases. Purchase limit and time limits can be attached to the borrowed card through the proprietary application running on the smartphone that initiated the borrowing of the card. Proximal Leash technology may also be enabled in one embodiment such that if the daughter in the above example lost her card, the lost card could be found and or disabled via a smartphone.

Module 300 contains a chip and or circuitry 307 enabling Bluetooth Low Energy (Hereafter BLE) also marketed as Bluetooth Smart. BLE is a wireless personal area network technology designed and marketed by the Bluetooth Special Interest Group aimed at novel applications in the healthcare, fitness, beacons, security, and home entertainment industries. Compared to Classic Bluetooth, Bluetooth Smart is intended to provide considerably reduced power consumption and cost while maintaining a similar communication range. Coil 304 represents part of the circuitry that enables the BLE functionality of Module 300. All coils 302, 303, 304 and 305 are wired appropriately for proper functionality although the wiring, actual chips or integrated circuits are not shown due to space considerations on the drawings.

Module 300 contains battery 306. Battery 306 may be charged inductively utilizing inductive charging coil 303 and associated circuitry. Module 300, in one embodiment, also includes a coil 305 for MST functionality, BLE coil 304 and NFC coil 302. Module 300 also contains MCU 309. An MCU is short for microcontroller unit which is a small computer on a single integrated circuit. In modern terminology, it is a system on a chip or SoC. A microcontroller contains one or more CPUs (processor cores) along with memory and programmable input/output peripherals. The MCU on Module 300 is a multipurpose MCU and controls certain functionality within module 300 such as battery charging, BLE two way communications with a smartphone application, MST implementation and NFC capability.

Figure 3A:
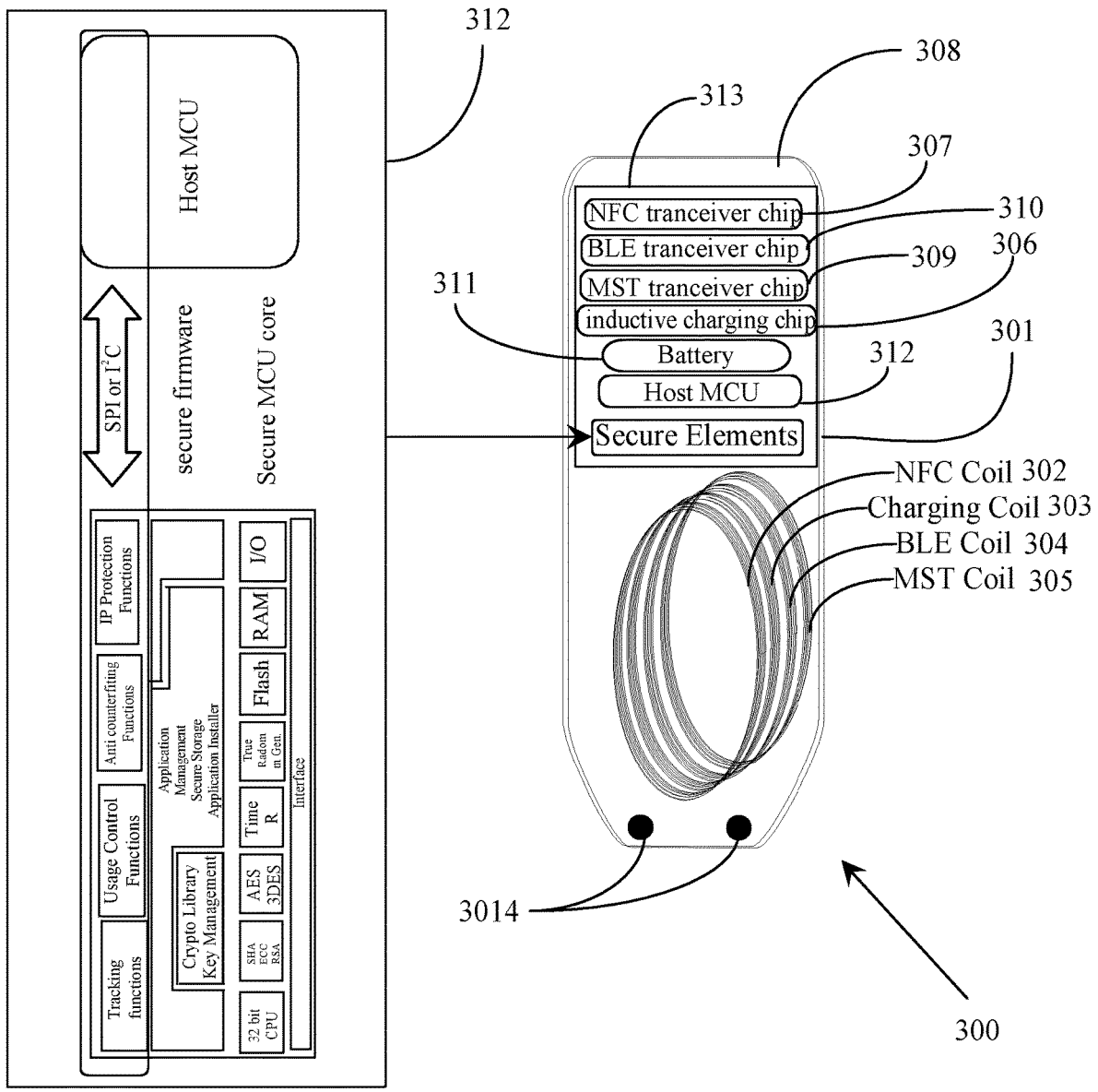
FIG. 3A is a view of a top view of a module of the present invention showing electronics, coils and encryption ability in addition to secure elements according to one embodiment of the invention.
Figure 6:
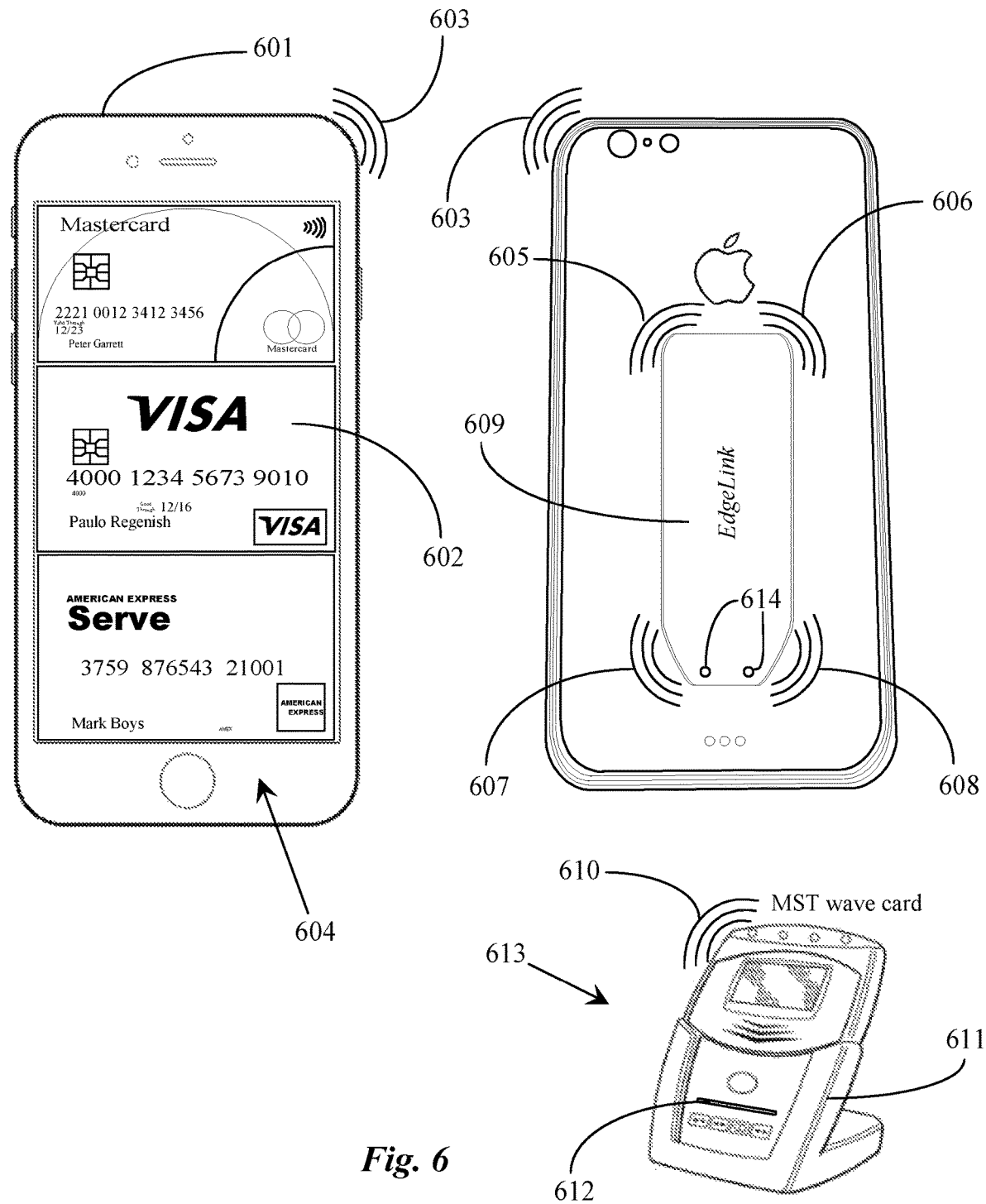
FIG. 6 is a view of a device with module affixed, a POS and a credit card or wallet application resident on the device according to one embodiment of the present invention.

FIG. 3A is a view of a module of the present invention showing electronics, coils and secure elements 312 according to one embodiment of the invention. Contactless payment technology incorporates proximal communications between two or more devices to authenticate and enable payment for goods and services over the air (OTA) or without physical connection. Near Field Communication (NFC) is an example of a proximity communication option that can enable contactless payment technologies and that are supported by the Global System for Mobile Communications (GSM) Association. RFID is an example of a proximity communication method that can be adapted to enable NFC contactless payment technology. MST proximal wireless technology may also be used in NFCs place in this example. NFC communication ranges generally range from about 3 to about 4 inches. Such short communication distances limit, as well as, enable secure communication between closely held proximity enabled devices. An NFC-enabled contactless payment device such as module 300 enables financial transactions, ticketing, secure authentication, and coupons among several services that are available to the device owner. The NFC contactless payment device module 300 can function as a credit card to enable purchases at the point-of-sale (POS) or even via merchant Websites, Where in the later case module 300 communicates via BLE to the host smartphone wallet or credit card application (as shown in FIG. 6) which can be used to secure bank information from an authenticating server called a trusted service manager (TSM). The bank information is used in a form entry for payments on a merchant Website. The TSM hosts and controls all credit card information sent to or withdrawn from a trusted NFC enabled contactless payment device such as module 300. Module 300, in addition to having inductive charging, also has contacts for a sleek contact type of battery charger.

Application for credit card secure element information acquisition and implementation for handling multiple credit card secure element information sets.

In one embodiment of the invention a software application for credit card secure element information acquisition and implementation for handling multiple credit card secure element information sets is disclosed. A card software application can be identified by Application Identifiers (AIDs) and are typically stored within the secure element 312 of the module 300 AIDs may be standardized by the ISO 7816 specification and include between 5 and 16 bytes. The first five bytes collectively of the AID is called a Registered Identifier (RID), which typically identifies the card company for example, MasterCard®, Discover®, or Visa®. The subsequent bytes may include the PIX or Proprietary application Identifier Extension, Which can be used to identify such information as the application type, version, manufacturer, and other information. The secure element 312 can exist within a removable smart chip, SD card, or embedded within a fixed chip on module 300. The secure element 312 allows a software application 802 of FIG. 8 to run or reside on module 300 and be accessible by the mobile device user to interact securely with certain functions within the secure element, while protecting a majority of the information stored within it. Secure element 312 on module 300 of FIG. 3A functions as a secure communication channel and uses encryption methods for communication between the secure element 312 and the smartphone 202 of FIG. 2 to which it is attached and its software. The secure element 312 on the module 300 includes crypto processors for calculating crypto algorithms, memory controller units to manage the Read Only Memory (ROM), Ready Access Memory (RAM), and EEPROM flash memory within.

Figure 3B:
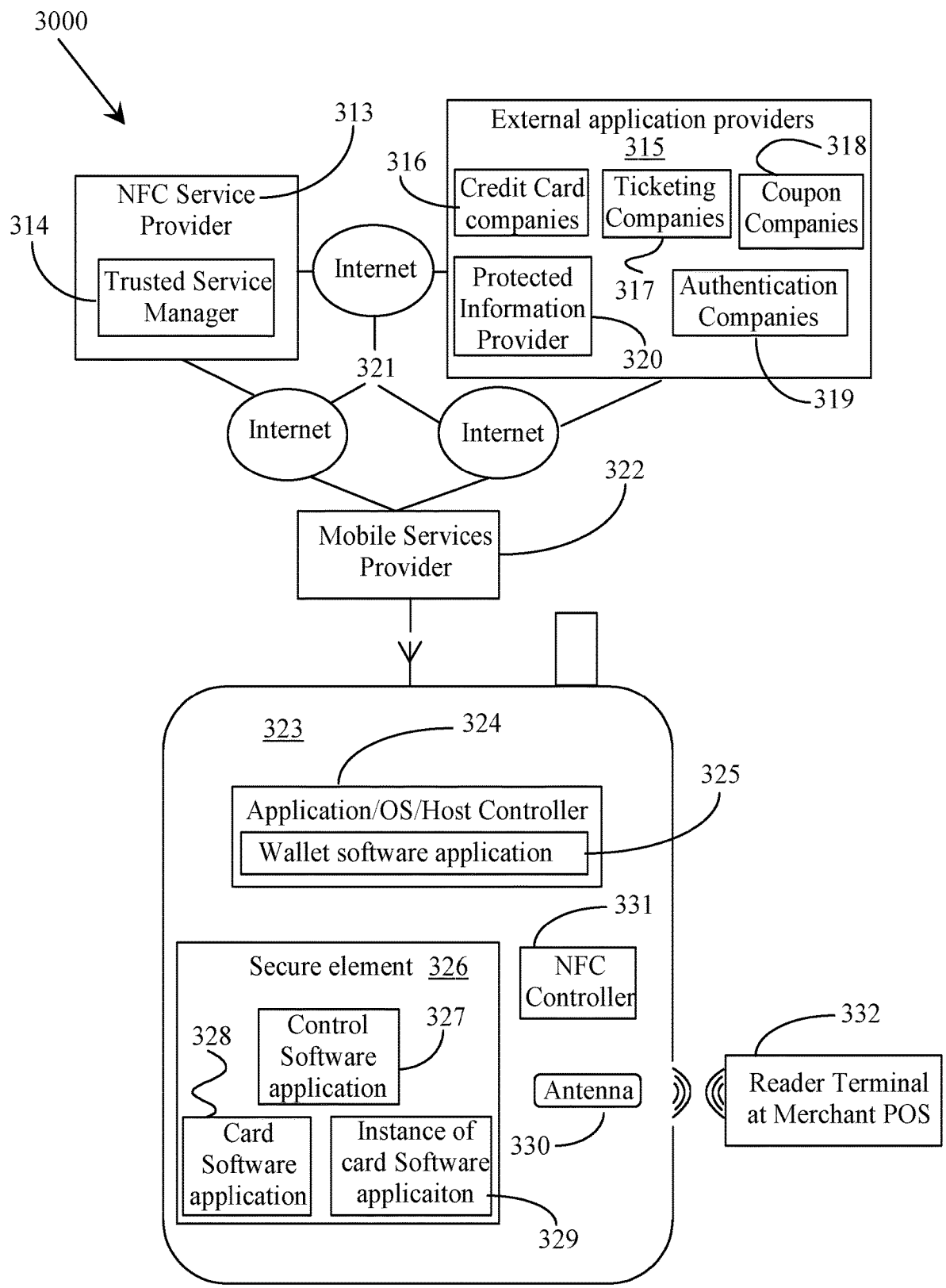
FIG. 3B depicts a block diagram illustrating systems for controlling multiple secure element based card software applications using a secure element based control software application according to certain exemplary embodiments of the present invention

FIG. 3B depicts a block diagram illustrating systems 3000 for controlling multiple secure element based card software applications using a secure element based control software application according to certain exemplary embodiments of the present invention. In one embodiment an external trusted service manager (TSM) 314 controlled by a near field communications (NFC) service provider 313 hosts and transmits card software applications for installation within the secure element 326 residing on module 300 of FIG. 3. The NFC service provider 313 provides a secure key encrypted software card application for decryption and installation in the secure element 326. The TSM 314 includes a trusted service agent, which may be an automated software distribution entity within the TSM. In certain exemplary embodiments, the TSM may be accessible to the module 300 of FIG. 3 via the internet 321 directly, without the requirement of a mobile services provider 322 for downloading trusted card software applications to module 300 or host smart phone. The mobile services provider 322 provides card software applications in one of many mobile services protocol, such as 3G and 4G. In certain exemplary embodiments, the TSM 314 may exist as a part of the mobile services provider 322.

In certain exemplary embodiments, external application providers 315 provide card software applications to the TSM 314 for deployment to the module 300. In an alternative embodiment, each of the external application providers 315 may include a TSM for providing trusted card software applications directly to the module 300 via the Internet 321 or the mobile service provider 322. Exemplary external application providers 315 include credit card companies 316 for providing credit card type payment card software applications (e.g., Java credit/debit/PayWave/PayPass type applets), ticketing companies 317 for providing tickets to events, travel, and other related functions, coupon companies 318 for providing coupons that are downloaded and scan-able at a point-of-sale (POS) using the module 300, RFID tags, barcodes, QR 2 dimensional bar codes, and other similar optical coding methods, an authentication company 319 for providing authentication data that may be used to lock/unlock physical appliances or for virtual functions on computer software, and a protected information provider 320, such as a bank, merchant, or other financial service provider, for providing confidential or otherwise protected information (for example, account information), which may be used to represent a particular card. One protected information provider 320 is a familial negotiation server (not shown). This server may authorize credit card use across families and friends and may be verified via social media accounts in part.

In certain exemplary embodiments, an application host OS 324 on resident on module 300 of FIG. 3, provides the user of the mobile device with module affixed with the capability to manage multiple card software applications and its instances 329 using a wallet software application 325, where the wallet software application does not need TSM 314 permission to perform certain functions on each of the card software applications and its instances 328-329. The management of the card software applications may be performed via a control software application 327, which communicates with the wallet software application 325 using an application protocol data unit hereafter APDUs, transmitted and received, through a secure and encrypted communication channel or may communicate to the wallet software in the same fashion via BLE from the module 300. The control software application may freely communicate with the multiple card software applications and its instances 328-329 because each of the card and control software applications are resident within the same secure element 326 on module 300. Alternatively, multiple secure elements providing a secure communication channels will provide the same functionality as disclosed herein. Thus the user may engage the control software application 327 using commands to activate, deactivate, prioritize, delete, and install card software applications within the secure element 312 of module 300. When the card software applications have been activated and prioritized, the NFC controller 331 is notified of the state of readiness of module 300 for an NFC transaction. NFC controller 331 polls a radio signal through antenna 330 or listens for radio signals from an interrogation device or reader terminal device 332. On establishing a channel between the devices 330 and 332, the reader requests to see the list of available card software applications within the secure element 326. A directory is first displayed, after which, based on the set priority or the type and capability of reader (NFC or MST), an application 328-329 is chosen and initiated for the transaction. If an NFC transaction is the preferred method of transaction based on the POS parameters such a transaction is initiated. If an MST transaction is the preferred method of transaction based on the POS parameters such a transaction is initiated.

It should be noted here that all credit card data sets, in one embodiment, are stored in a secure cloud environment and could be chosen for a transaction just prior to the transaction taking place. The mobile wallet will mirror all of the card data sets that the user has loaded into their smart phone or other personal digital assistant. The user simply selects the funding source for the transaction among their preloaded cards loaded either by web or an app resident on the smartphone or other digital assistant. The selected funding source is transmitted to the smartphone or other digital assistant and then to module 323. From module 323 the transaction takes place either by NFC or MST as previously discussed.

Figure 4:
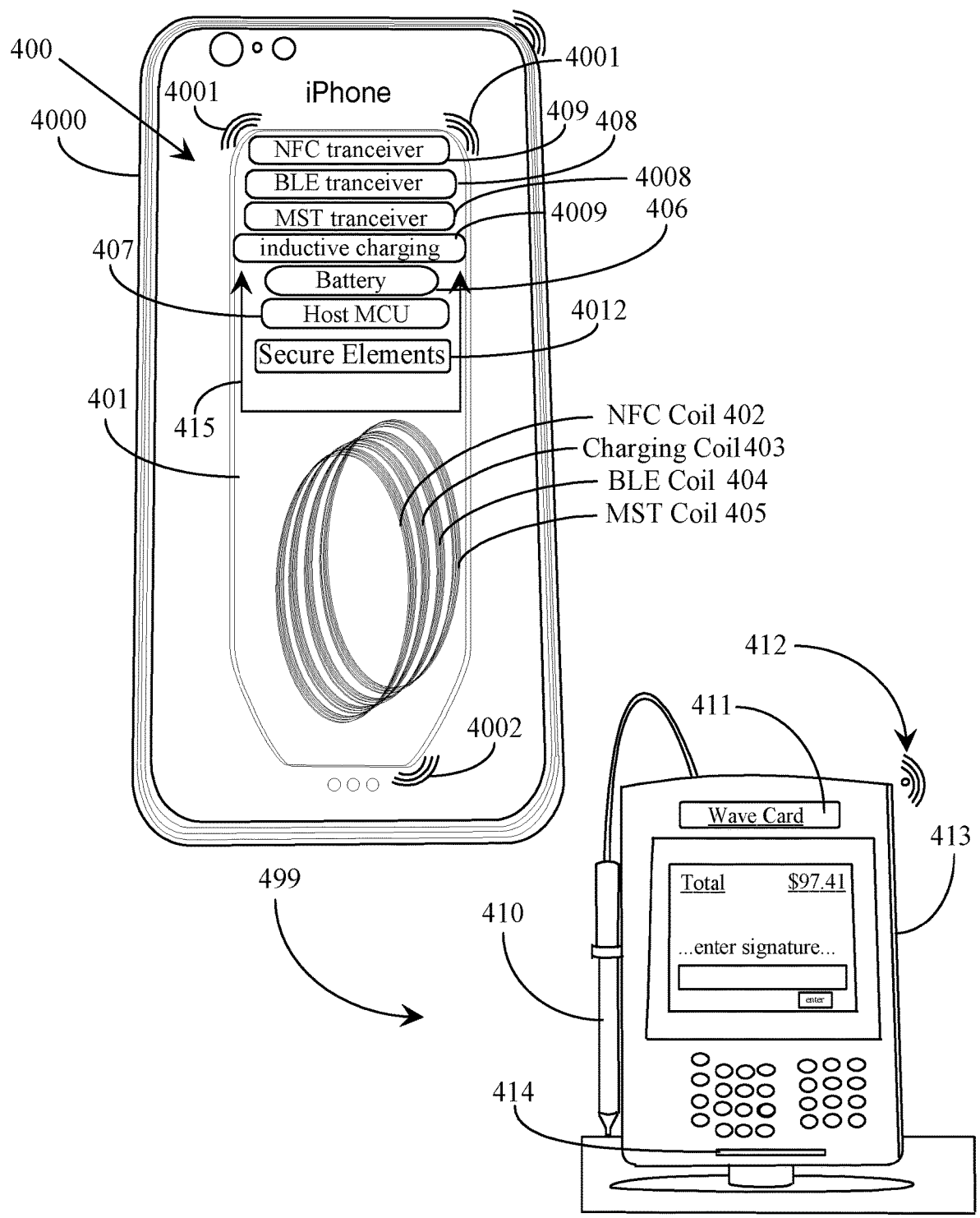
FIG. 4 is a view of a module of the present invention interacting with a wireless point of sale credit card transaction device according to one embodiment of the invention.

FIG. 4 is a view of a module 400 of the present invention interacting with a wireless point of sale credit card transaction device 499 according to one embodiment of the invention. In this embodiment the POS 499 is has wireless capability and can perform NFC wireless credit card transactions, conventional, slide the magnetic stripe through the slot credit card transactions and MST wireless credit card transactions.

Most smart phones do not have unfettered access to NFC functionality of their mobile devices. Most manufacturers force the user to use their NFC applications. Some of those users do not want to use certain NFC applications preferring to have their own choice in the matter of application development, deployment and use concerning NFC functionality. With module 400 attached or affixed to a mobile device, unfettered NFC functionality is available to that mobile device.

When discussing electronics chips and circuitry in this application we may refer to them as a chip and or circuitry and or coil. These terms mean any circuitry, chips or coils to enable the electronic technology we are discussing at the time. All circuitry is contained on a board or chip. In the case of FIG. 4 it is board 415.

In this embodiment we have module 400 affixed to a smart phone 4000. Module 400 is enabled for NFC functionality via NFC transceiver chip/controller 409 and coil 402. Module 400 also is enabled with BLE functionality via BLE transceiver chip 408 and coil 404. MST functionality is enabled via transceiver chip 4008 and coil 405. Inductive charging for battery 407 is enabled via inductive charging circuitry 4009 and coil 403. Module 400 is also enabled with Host MCU 407 and secure elements 4012.

POS 499 is enabled with NFC and MST wireless credit card transaction capability as well as a smart chip insertion or the conventional slide of a magnetic stripe of a credit card to perform credit card transactions. POS 499 is also equipped with writing device 410, credit card smart chip insertion slot 414, conventional sliding slot 413, NFC device wave area 411 as well as MST capability enabled through the signal antenna 412.

In this embodiment module 400 may be attached to a smart phone or a smart phone case or any other personal digital assistant with the ability to communicate with module 400 via BLE. Module 400 as discussed has the circuitry and functionality to perform NFC or MST wireless credit card transactions.

In this embodiment smartphone 4000 may be waved over wave card area of POS 499 to perform an NFC transaction. The NFC capability however will be enabled via module 400 affixed to the back of phone 4000. The NFC transaction will be communicated to a credit card or wallet application resident on smart phone (as discussed in FIGS. 3A and 3B)

via the BLE capability of module 400. Secure elements are handled as discussed in FIGS. 3A and 3B.

Figure 5:
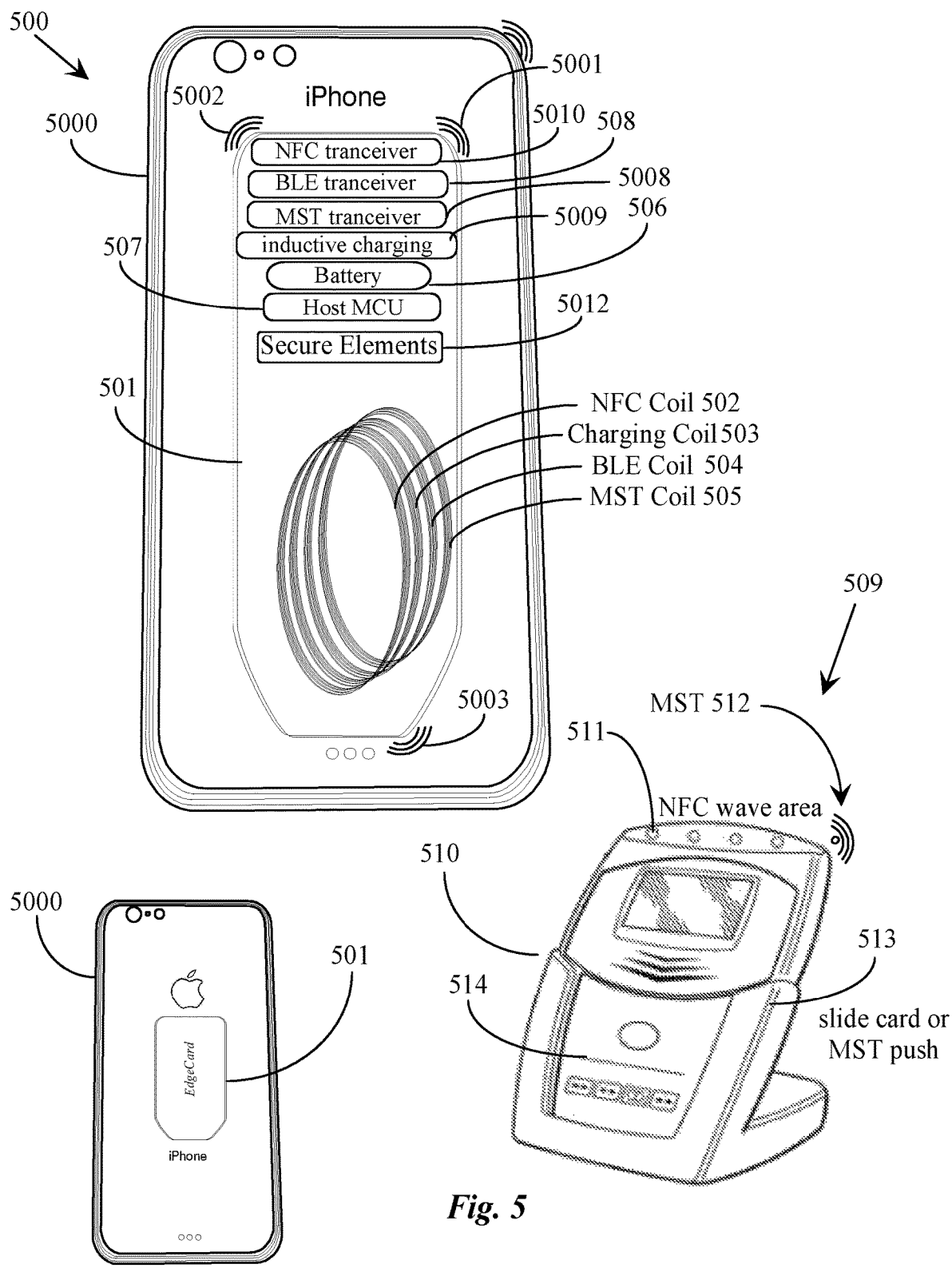
FIG. 5 is a view of a module of the present invention interacting with another wireless point of sale credit card transaction device to perform an MST wireless credit card transaction according to one embodiment of the invention.

FIG. 5 is a view of a module of the present invention interacting with another wireless point of sale credit card transaction device to perform an MST wireless credit card transaction according to one embodiment of the invention.

Module 501 of FIG. 5 is enabled for NFC, BLE and MST wireless communication. NFC is enabled via NFC transceiver 5010 and coil 502. BLE is enabled through BLE transceiver 508 and coil 504, and MST is enabled through MST transceiver 5008 and coil 505. The NFC frequencies transmitted and received are shown as element 5002, The MST wireless frequencies transmitted and received are shown as element 5001 and the BLE wireless frequencies transmitted and received are shown as element 5003. Module also has a host MCU 507, a battery 506 charged via inductive charging element 5009 and inductive charging coil 503.

The POS according to this embodiment of the invention is shown as element 509. POS 509 has MST and NFC wireless credit card transaction capability as well as the standard magnetic strip sliding through slot 513 of POS 509. Element 511 shows the NFC wave area of the POS 509. POS 509 is also enabled with a smart chip insertion slot 514 for transactions with smart EMV chip cards.

In this embodiment of the invention the smart phone or personal digital assistant with module 501 affixed is shown as element 500. In this embodiment the user of element 500 chooses to perform an MST wireless credit card transaction with his combination device. His smartphone alone will not allow him to perform an MST transaction on its own. In this embodiment NFC capability of POS 509 is out of order and the user has no physical credit cards on his person to perform a standard transaction thus necessitating the MST transaction.

In this embodiment the user chooses his card on a credit card or wallet software application 604, as seen in FIG. 6, resident on the smartphone 5000 of FIG. 5 or 601 of FIG. 6. Secure elements of the transaction are handled according to prior discussion in FIGS. 3A and 3B. Once the user's Visa™ card is chose n application 602 initiates a wireless credit card transaction by communicating the necessary information via BLE to module 501. Module 501 handles the secure elements of the transaction according to discussion in FIGS. 3A and 3B and then sends the appropriate MST signal to emulate the credit card the user has chosen on application 602. POS 509 receives the signal and performs the appropriate functions and communicates the necessary information back to module 501. Module 501 then sends the completed transaction information to the application 602 resident on smartphone 5000 via BLE. The transaction is now complete.

FIG. 6 is another example of an MST transaction taking place according to one embodiment of the invention and includes credit card or wallet software 604 residing on the device 601 to which module 609 is affixed. In this embodiment user has a smartphone 601 with software application 604 residing on the phone. Smartphone 601 is also enabled with BLE wireless transceiving capability element 603. Module 609 is shown in high level as more detail was previously discussed. Module 609 enjoys all of the capability discussed in the entire specification and related drawings. Element 605 shows MST wireless capability of module 609. Element 606 shows NFC wireless capability of module 609. Element 607 shows BLE wireless capability of module 609 and element 608 shows wireless inductive charging capability of module 609. A POS 613 is also shown enabled with MST technology.

In this embodiment a user of phone 601 utilizes software application 604 to choose a credit card (date set 602 (Visa)) he would like to use to make a wireless credit card transaction using his module 609 in concert with his smart phone. User selects visa card 602 and a transaction is initiated. Software application, through the BLE capability of smartphone 601, communicates the desired transaction to module 609. Module 609 handles secure element aspects of the transaction by communication between the software app and the module 609 (and the cloud if necessary through the smartphone BLE) according to the discussion referring to FIGS. 3A and 3B. Module 609 sends a magnetic secure transmission signal to POS 613. POS 613 is enabled with MST capability represented by element 610. POS Elements 611 and 612 are not needed in this embodiment. POS 613 completes the transaction by communicating with module 609. Module 609 then communicates the resulting transaction to software application 604 on smartphone 601 thereby completing the MST transaction.

Figure 7:
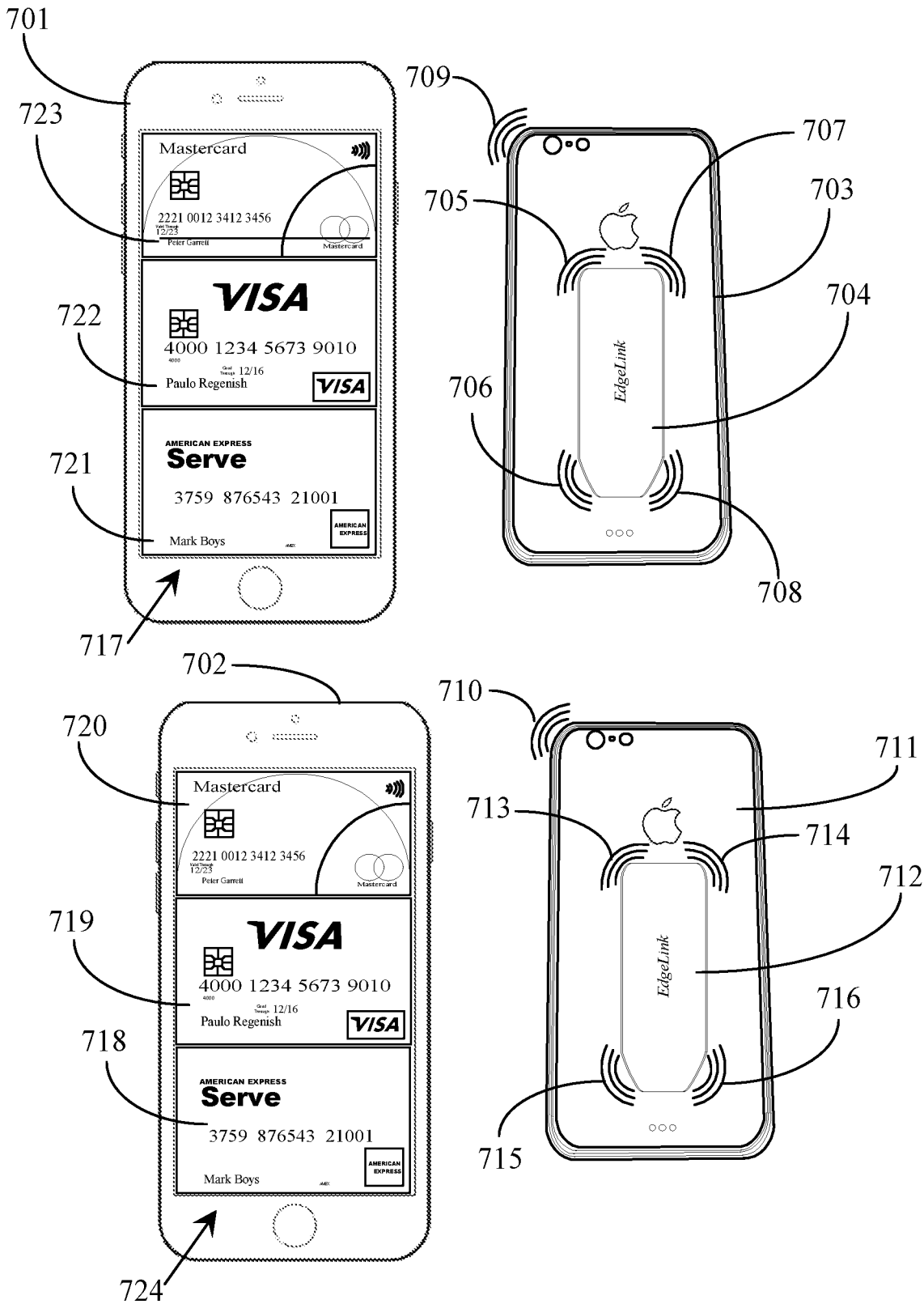
FIG. 7 is a perspective view of the interaction between 2 devices or smart phones with modules of the invention affixed interacting with one another.

FIG. 7 is an illustration of 2 instances of 2 smartphones 701 and 702 with modules 704 and 712 affixed respectively. Both phones are running a credit card or smart wallet software applications. A first phone 701 is enabled several credit card choices 721, 722 and 723 for use in credit card transactions. A second phone 702 is also enabled several credit card choices 718, 719 and 720 for use in credit card transactions. Modules 704 and 712 are both enabled with two kinds of wireless credit card technologies, NFC and MST. Both modules 704 and 712 are able to communicate with their respective smart phone devices via BLE. In module 704 NFC is shown enabled via element 705 (small partial circles indicate wireless transmission and receiving capabilities). MST is shown enabled via element 706. BLE is shown enabled via element 707. Element 708 is an inductive charging coil. In module 712 NFC is shown enabled via element 713. MST is shown enabled via element 715. BLE is shown enabled via element 714. Element 716 is an inductive charging coil.

In one embodiment user 1 and user 2, old buddies, decide to go shopping at the mall. User 1 decides he wants to borrow some funds from user 2 to put on his credit card application so he can get some things from Victoria Secret for his girlfriend. In one embodiment of the present invention one family member or friend may borrow funds from another's credit card or wallet application in much the same way that protected information providers 320 of FIG. 3B work with other protected information authorizing funds for transfer between smartphone applications. User one transfers funds to user 2 for the purchase through the modules affixed to the back of their phones. Using modalities discussed in FIG. 3 and throughout the specification.

Figure 8:
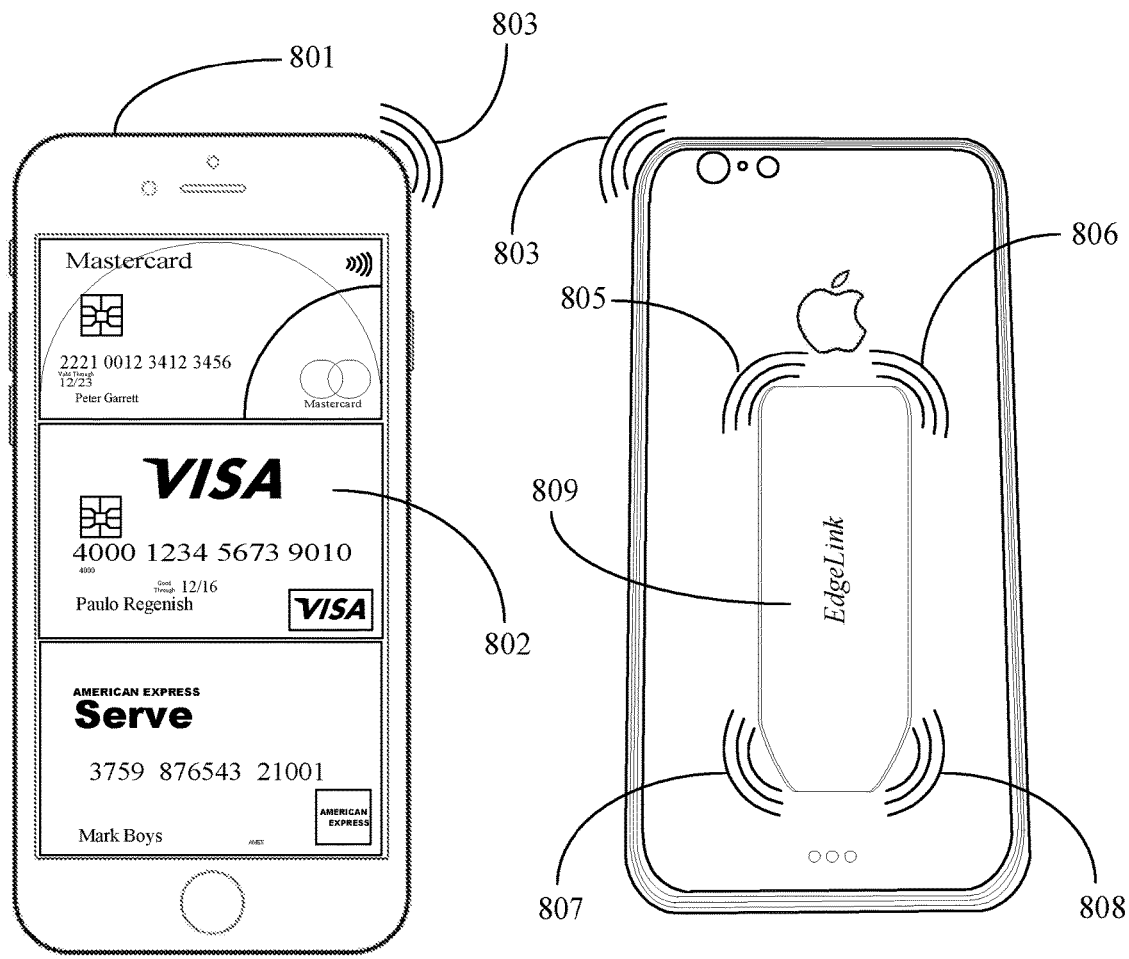
FIG. 8 is a view of a device with module affixed, a POS and a credit card or wallet application resident on the device according to one embodiment of the present invention.
Figure 8:
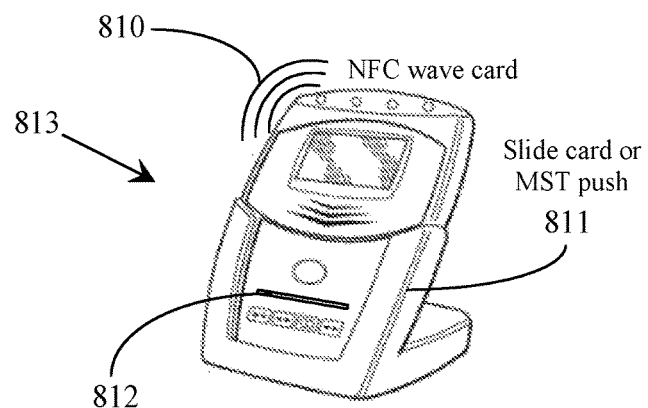

FIG. 8 shows the front smart phone 801 with smart wallet application running on smartphone. Element 803 indicates the native wireless capability of smartphone 801. Card indicia 802 can be seen on the front of smartphone 801.

The back of smartphone 801 shows an electronics module 809. Module 809 is enabled with NFC 806, MST 805, BLE 807 and inductive charging capability. Module 809 also has all of the capability discussed within the 4 corners of this specification. As discussed before smartphone 801 with module 809 attached can perform credit card transactions with NFC, MST and by magnetic stripe which MST emulates. The special part about this embodiment is the smart wallet software is also in the cloud and has been configured by the user to hold all of their financial accounts very securely. In one embodiment the user has set a hierarchy of financial accounts that he usually uses. In this embodiment his top couple of cards can be displayed on the POS touch screen and the user can simply tap the one he wants to use and the transaction can proceed without the standard method of tapping or swiping cards. The POS system can identify him by the interrogation apparatus POS 813 via the wireless module 809. Alternatively the user can select a card from his screen for the transaction to proceed via NFC, MST.

Figure 9:
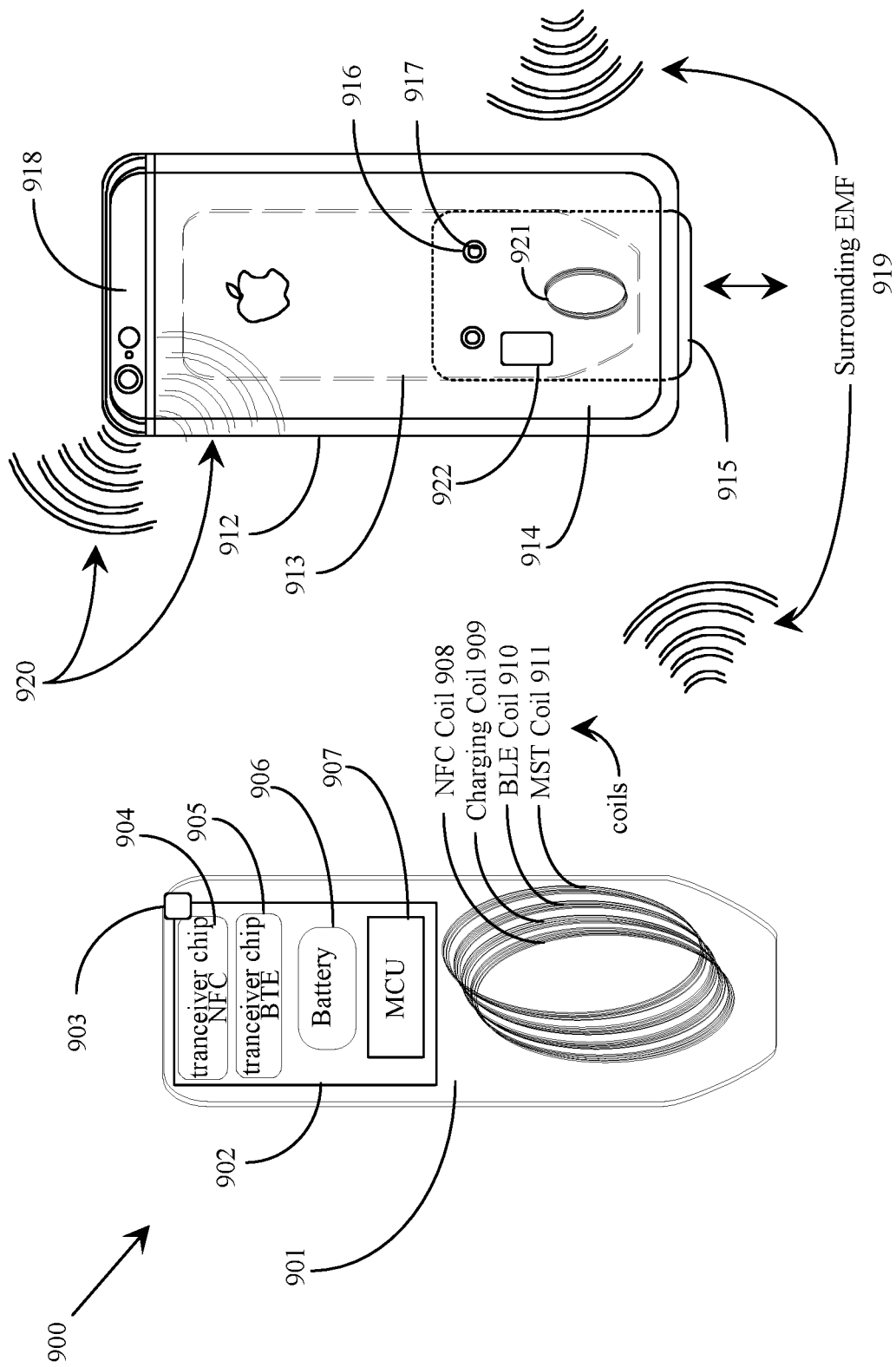
FIG. 9 is a view of a smartphone case with module functionality showing inductive charging of a case and a smartcard with energy harvested from EMF either the environment or from the use of the smartphone resident in a case according to one embodiment of the present invention.

FIG. 9 shows how module 901 can work with coils 908, 909, 910 and 911 to glean energy to charge the battery of a module of the invention and how a debt or credit smartcard may be charged by gleaning energy from the surrounding EMF waves or from the use of a smartphone that is in resident in the case such as case 912 of FIG. 9. which contains a smartphone Module 900 is an electronics package that may be affixed to a smartphone, a smartphone case or built into a smartphone case. The purpose of module 900 is to give a smartphone user capability he normally would not have using a smartphone out of the box such as NFC transaction capability. Module 900 contains an electronics package 902 including but not limited to an NFC transceiver chip 904, a Bluetooth wireless capability 905, a rechargeable battery 906, MCU 907 and various coils handling NFC, inductive charging, bluetooth communication and MST transaction capability. These coils may also be used to do other tasks sent from controller 909

Another use of module 900 is to repurpose coils 908-911 these coils, controlled by MCU 907, can be used to glean energy from the environment or from the use of the smartphone itself to inductively recharge battery 906. An MCU is short for microcontroller unit which is a small computer on a single integrated circuit. In modern terminology, it is a system on a chip or SoC. A microcontroller contains one or more CPUs (processor cores) along with memory and programmable input/output peripherals. The MCU on Module 300 is a multipurpose MCU and controls certain functionality within module 300 such as battery charging, BLE two way communications with a smartphone application, MST implementation and NFC capability as well as controlling coils for sensing and gleaning energy from the environment and controlling inductive charging of smartcard and or module.

Smartphone case 912 contains a smartphone 918 as well as all of the functionality of module 900 as it is spoken of here and throughout this specification. In this embodiment the module 913 is either built into the case 912 or affixed in any other manner suitable for the purposes discussed. Elements 916 and 917 are physical contacts in which the smartcard 915 may interact with to perform recharging of battery 906. Smart card 915 may slide into a slot made in the case for this purpose. Module 913 may also contain charging contacts in other embodiments wherein they are designed to charge module after sliding into a charger In one embodiment there is a plethora of electromagnetic signals surrounding all of us at all times. The controller of the invention can sense electromagnetic magnetic energy by sensing its frequency and adjusting the receiving coils using smart power management and rapid resonant matching technologies rapidly adjust receiving coils to match the surrounding environs. EMF 919 are within range of smartphone case and phone within. Module 913, built into case, senses these EMF frequencies, direction, strength, frequency etc. . . . based on this smart receiving technology the module 913 can adjust itself to glean as much energy as can based on these various factors. Power is rectified through the supplied circuitry (not shown) and stored in the rechargeable battery of the smart module 913 or is sent straight to the smartcard 914 based on smart power management technology.

In the above embodiment the power is collected in the battery of the module 913 and later trickled to a smartcard debit or credit card to top up the charge of the smartcard. In this embodiment the roles are reversed and the module becomes the transmitter (primary coils) and the smartcard becomes the receiver (secondary coil). In this way the smartcard remains charged enough to perform the next financial transaction.

In one embodiment the EMF 920 is coming from the smartphone 918 in the smart case 912. This is sensed by module 913. Module 913 recognizes this EMF as it has a pattern and frequency that module 913 is familiar with. Module 913 acts as secondary coil and receives energy transmitted my smartphone 918 in smart case 912 to module 913 to be processed and rectified and stored either in module battery 906, smartphone battery via induction or the smartcard battery 922 via induction coil 921 or contacts or either the smartphone battery 922 or module battery 906.

What is claimed is:

1. A wireless electronics module comprising;
    a near-field communication (NFC) transceiving capability;
    a Bluetooth Low Energy (BLE) transceiving capability;
    a magnetic secure transmission (MST) capability;
    a battery capable of inductive charging;
    a host microcontroller unit (MCU);
    a fully compliant secure element module capable of handling multiple credit card financial datasets;
    a coil providing NFC wireless transceiving capability;
    a coil providing MST financial transaction capability;
    a coil providing BLE wireless transceiving capability;
    a coil providing inductive charging capability wherein said module may be built into a smartphone case adapted to accept a smartcard with a battery for inductive charging, the smartcard being inserted into a case or in proximity of said case to be charged inductively from energy gleaned from the environment.
2. The wireless electronics module of claim 1 wherein the energy to charge said smartcard is gleaned from the use of the smartphone resident in smartphone case.

* * * * *